May 26, 1925. 1,539,634
G. BESSON
SIGNAL
Filed Aug. 29, 1924
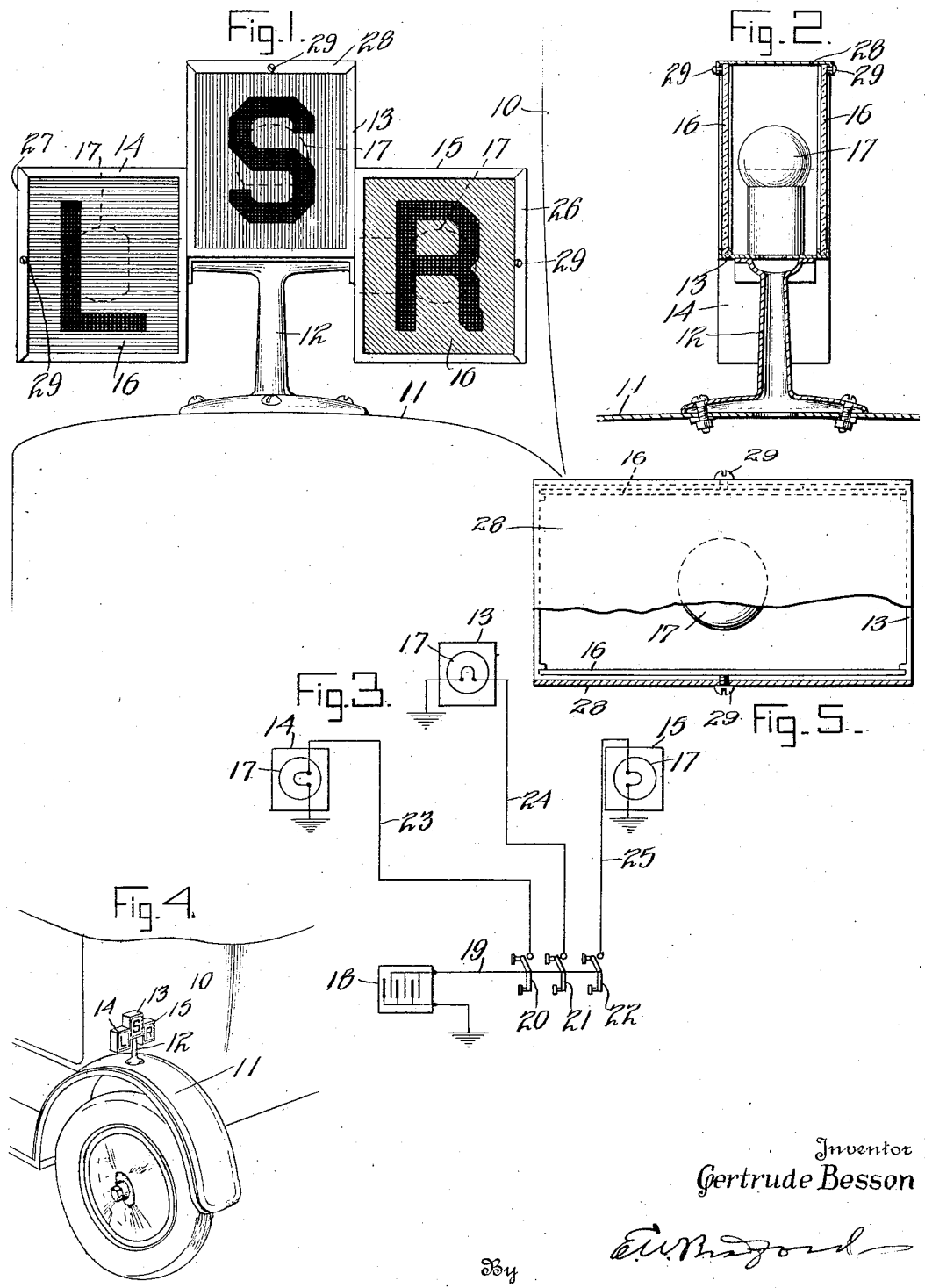
Inventor
Gertrude Besson Patented May 26, 1925.

1,539,634

UNITED STATES PATENT OFFICE.

GERTRUDE BESSON, OF INDIANAPOLIS, INDIANA.

SIGNAL.

Application filed August 29, 1924. Serial No. 734,996.

*To all whom it may concern:*

Be it known that I, GERTRUDE BESSON, a citizen of the United States, residing at Indianapolis, in the county of Marion and State of Indiana, have invented certain new and useful Improvements in Signals, of which the following is a specification.

My said invention relates to an automobile signal and it is an object of the same to provide improved means for indicating the intention of the driver to stop or turn.

Referring to the accompanying drawings which are made a part hereof and on which similar reference characters indicate similar parts, Figure 1 is a rear elevation of my signal, Figure 2, a central vertical section of the same, Figure 3, a plan of the electrical connections, and Figure 4 a perspective of a part of a vehicle equipped with my signal.

Fig. 5 is a top plan view of the upper central casing with a portion of the top broken away.

In the drawings reference character 10 indicates the body of an automobile having a fender 11 on which is mounted a bracket 12 arranged to support three compartments 13, 14 and 15 here shown as having flat faces and as being rectangular in section so that they are of square form as viewed from the rear. Preferably the signal is placed on the left rear fender. Each of the compartments is provided with front and rear windows 16, those of the middle compartment being preferably red, those of the right compartment green and those of the left being purple or blue. It will be understood that instead of colored windows for the compartments I may provide bulbs 17 of different colors for different compartments. The windows are provided with signalling means in the form of letters which are preferably black. The device as here shown has letters "L," "S" and "R" signifying "Left," "Stop" and "Right" but other indicia may be used to suit particular situations.

In the wiring diagram a battery is indicated at 18 which is connected by a wire 19 to three switches 20, 21 and 22 which are preferably of the push-button type so that when operated a signal will stay on until a complete turn has been made or until the car has stopped completely whereupon the operator will push the opposite button to open the switch and terminate the signalling operation. As here shown switch 20 closes the circuit through conductor 23 to the light in compartment 14 and thus to ground; switch 21 through conductor 24 and a lamp in compartment 13 to ground; and switch 22 through conductor 25 and the lamp in compartment 15 to ground.

The square shape of the compartments lends itself to a convenient means for opening and closing them as for removal of burnt out lamps, etc. The compartments 16 and 17 are each provided with side doors 26 and 27, and the intermediate compartment 13 with an upper door 28. These doors are held in place by small screws 29 and when the screws are unloosened may readily be slipped off to permit the lamps to be replaced. When the screws are tightened they will hold the doors securely in place.

My purpose in locating the signal on top of the rear fender at the left-hand side of the machine is to give it the utmost possible visibility to the other drivers. Obviously this position renders it most easily visible to a driver of a following machine. At the same time it is readily visible to a machine approaching from the front because of the transparent lens at opposite sides of the signal, the lens or windows at each side being provided with similar indicia whereby the driver of an approaching automobile will be notified of the intention of the driver of the first machine to turn right or left or to stop and to govern himself accordingly.

It will be obvious to those skilled in the art that my device may be modified in various ways without departing from the spirit of the invention and therefore I do not limit myself to what is shown in the drawings and described in the specification but only as indicated in the appended claims.

Having thus fully described my said invention what I claim as new and desire to secure by Letters Patent, is:

1. An automobile signal comprising a T-shaped support and three rectangular casings, one of the casings having a width co-extensive with the length of the upper arm of the T and supported thereon the other two being located at the sides respectively of the first-named casing with their tops substantially below the top of said first-named casing and supported at the ends of the upper arm of the T, a signal plate for each of said casings, means on the latter for slidably receiving a signal plate in a face of the casings, and holding means providing for the removal of said signal plates at the top of the first casing and the outer sides of the outside casings, substantially as set forth.

2. An automobile signal comprising a T-shaped support and three rectangular casings, one of the casings having a width co-extensive with the length of the upper arm of the T and supported thereon the other two being located at the sides respectively of the first-named casing with their tops substantially below the top of said first-named casing and supported at the ends of the upper arm of the T said upper arm being substantially semi-circular in cross section and the lower arm of said T being substantially cylindrical in cross section to provide a conduit for wires, a signal plate for each of said casings, means on the latter for slidably receiving a signal plate in a face of the casings, and holding means providing for the removal of said signal plates at the top of the first casing and the outer sides of the outside casings, substantially as set forth.

In witness whereof, I have hereunto set my hand and seal at Indianapolis, Indiana this 26th day of August, A. D. nineteen hundred and twenty-four.

GERTRUDE BESSON. [L. S.]

Witnesses:
E. W. BRADFORD,
M. L. SHULER.